Patented Oct. 11, 1932

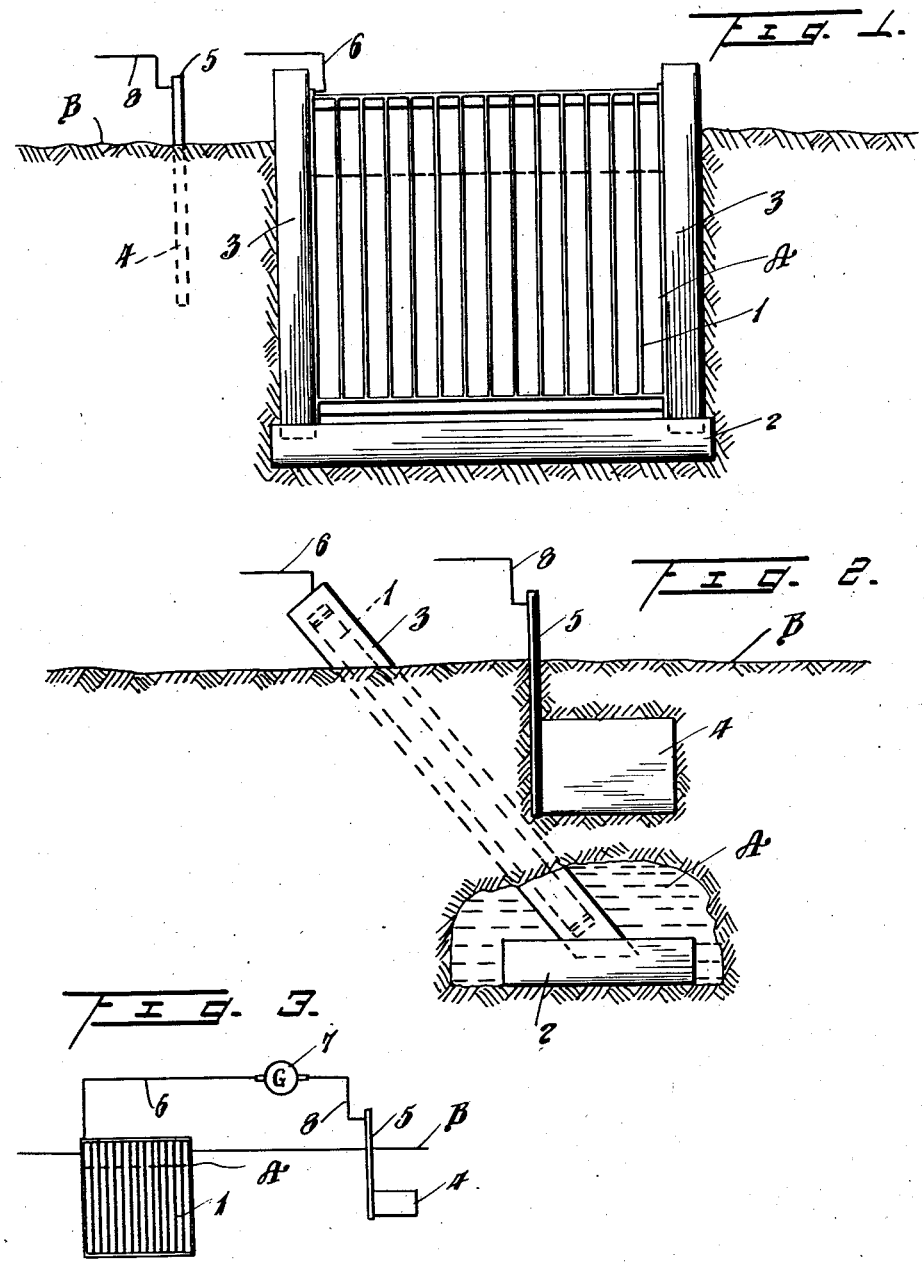

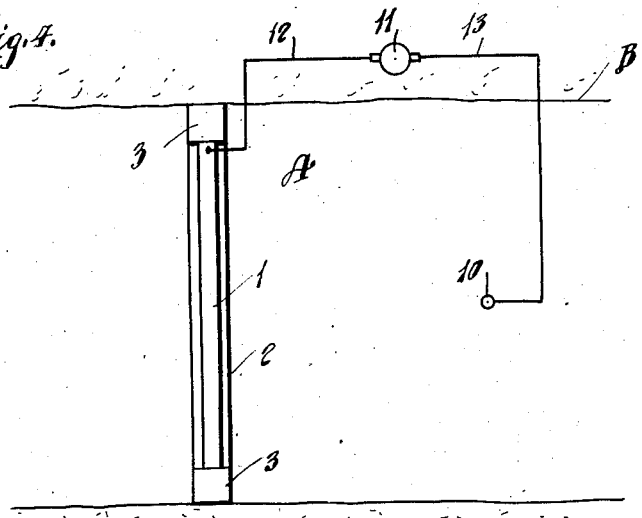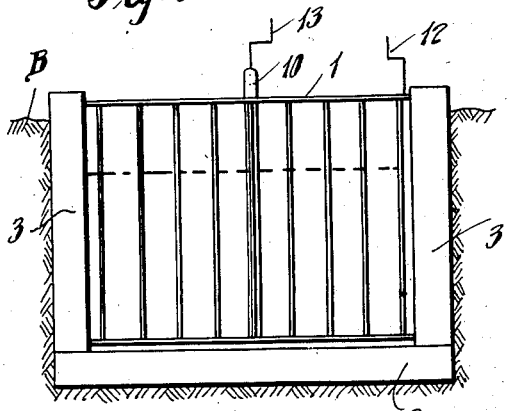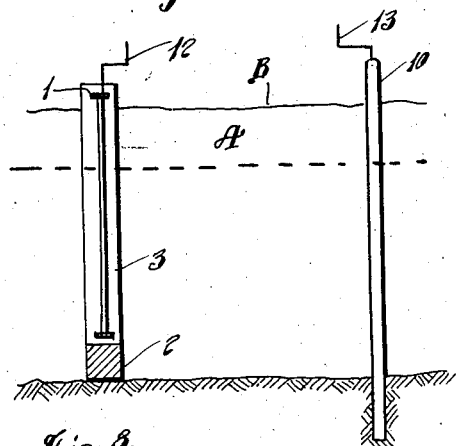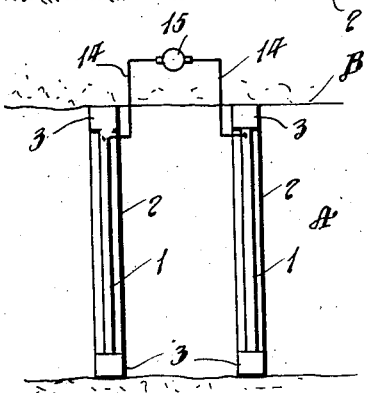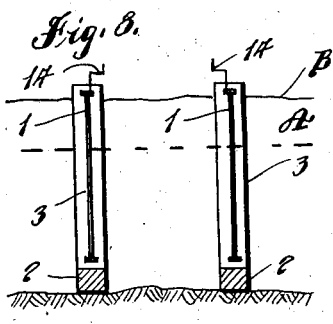

1,882,482

UNITED STATES PATENT OFFICE

HENRY THEODORE BURKEY, OF SOUTH PASADENA, CALIFORNIA, ASSIGNOR, BY MESNE ASSIGNMENTS, TO BURKEY MANUFACTURING COMPANY, A COPARTNERSHIP COMPOSED OF H. T. BURKEY AND O. Q. BECKWORTH, OF LOS ANGELES, CALIFORNIA

FISH DIVERTER FOR IRRIGATION DITCHES, FLUMES, NATURAL WATERWAYS, AND THE LIKE

Application filed July 12, 1928. Serial No. 292,136.

The invention relates to improvements in means for preventing fish from following the courses of irrigation ditches, flumes, natural waterways, and the like and has for its object the provision of improved means employing electric current that uses the water in the ditch, flumes or natural waterways and the adjoining ground to close the circuit of the electric current so that the water will be sufficiently electrified to prevent fish entering the zone of electrification and thereby prevent the fish from following the water course.

A further object of the invention is the provision of means by which a screen located in the ditch or natural waterways for intercepting floating trash and débris is utilized as an electrode for a fish diverter and is connected with a source of electric energy, an electric conductor being contacted with the ground adjoining the ditch or water course and also connected with a source of electric energy, this arrangement admitting of utilizing the water in the water course or ditch and the adjoining ground as a conductor of electric current to electrify the water adjacent to the screen to prevent fish and water mammals from following the course of the ditch or water course.

Another important object is to provide a construction wherein electric current will flow lengthwise through the body of a fish and in the line of flow of the water and progress of the fish.

The invention will be described in detail hereinafter and will be found illustrated in the accompanying drawings in which:

Figure 1 is a transverse sectional view of a ditch showing the improved fish diverter in position therein, Figure 2 is a side view partly broken away, Figure 3 is a diagrammatic view of the electric circuit, Figure 4 is a plan view of the device showing the electrodes differently positioned.

Figure 5 is a view of the parts of Figure 4 taken in position arranged transversely of a stream, Figure 6 is a vertical longitudinal sectional view of the form of Figures 4 and 5, Figure 7 is a plan view of a further modified form, and Figure 8 is a fragmentary vertical sectional view of the form of Figure 7.

In the drawings similar reference characters will be used to designate corresponding parts in the several views.

The improved fish retarder is shown in Figures 1 and 2 installed in an irrigation ditch A, and utilizes the usual screen that is mounted in the ditch, and designated 1, and constructed of electric conducting material such for instance as iron or steel, as one of the electrodes for the diverter.

The screen 1 is preferably mounted in a frame comprising a base 2 and inclined uprights 3 made of a suitable non-conductor, this structure being common in irrigation ditches to catch floating trash and débris. In the ground B adjoining the ditch A, is a plate 4 that is formed of a conductor of electricity and having a rod 5 secured thereto and extending above the surface of the ground, said plate 4 and rod 5 forming the other electrode. The screen 1 is connected by means of a wire or other suitable conductor 6 to a source of electric energy 7 which may be a generator as suggested or any other suitable source, and 8 indicates a wire connecting the source 7 with the rod 5.

It will be apparent that when an electric current flows through the wire 6 to the screen 1 from the source 7 that the electric current will pass through the water in ditch A, thus electrifying the water adjacent to the screen 1 and the current will be completed through the plate 4, the post 5, and the wire 8 to the source of electric energy 7. By electrifying the water in the ditch it will be apparent that there will be a constant flow of electricity in the ditch that fish and water mammals will be prevented from entering the electrified zone and prevented from passing on through the screen with the current of water in the ditch.

In the form of Figures 4, 5 and 6, a screen base and sides exactly similar to that used in the preceding form is employed and accordingly the same reference characters have been applied thereto. This screen however is preferably arranged truly vertical as shown. The screen is designated 1. Coacting with the screen 1 as one of the electrodes, is a post or pole 10 constituting the other electrode and the same is arranged vertically in the middle of the screen in slightly spaced relation to the screen A. In this form, the electric curent travels from the source as at 11 through conductors 12 and 13 to the electrodes 1 and 10, respectively and thence through the ground and body of water.

Particular attention is called to the fact that in this form, which in many respects is my preferred one, that the electricity travels substantially in the line of flow of the body of water and hence will pass lengthwise through the body of the fish to cause it to divert its course and leave the zone of electrification.

The same result as accomplished by the preceding form of Figures 4, 5 and 6 is attained with that of Figures 7 and 8. In the latter structure, two of the screens 1, with an associated base 2 and sides 3 as in the previous form, are used, being vertically arranged transversely of the stream and being connected through conductors 14 in communication with a source of electric current at 15. In this form also, the electric current travels in the line of flow of the water and hence will pass longitudinally through the body of the fish to cause it to divert its course.

Various changes may be resorted to provided they fall within the spirit and scope of the invention.

I claim as my invention.—

1. In a fish diverter for irrigation ditches, flumes, natural waterways and the like, a waterway, electrodes arranged in the water in said waterway and so related as to cause the electric current to travel in a general direction parallel with the flow of water through said waterway.

2. In a fish diverter for ditches, streams and other courses or bodies of water, either natural or artificial, means for electrifying a portion thereof so that the electric currents will travel in a general direction parallel with the flow of the water therethrough.

3. In a fish diverter a waterway, electrodes imposed in said waterway and spaced apart in the direction of flow of water so as to form a zone therein through which is caused to flow electric currents in a general direction parallel with the flow of water and in a line transversely to the position of said electrodes to divert fish passing therethrough and to deflect them from their directional course of travel.

4. In a fish diverter, a waterway, a plurality of electrodes therein so arranged and spaced from one another as to form a zone relative to the ground enclosing the waterway and in electrical conjunction therewith, the water in said waterway and within the limits of said zone being electrified by electric currents flowing through said electrodes, said electric currents flowing in a general direction parallel with the flow of water in said waterway so as to deflect fish from their directional course of travel.

5. A method of diverting fish from their directional course of travel consisting in establishing a stationary zone within the limits of a waterway and electrifying water in said zone by electric currents moving in a direction parallel with the direction of flow thereof.

In testimony whereof I affix my signature.
HENRY THEODORE BURKEY.